(12) United States Patent
Ambrosi

(10) Patent No.: US 8,617,025 B2
(45) Date of Patent: Dec. 31, 2013

(54) PLANETARY GEARBOX

(75) Inventor: Marco Ambrosi, Penig (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/121,463

(22) PCT Filed: Sep. 4, 2009

(86) PCT No.: PCT/EP2009/061450
§ 371 (c)(1),
(2), (4) Date: Jun. 7, 2011

(87) PCT Pub. No.: WO2010/034607
PCT Pub. Date: Apr. 1, 2010

(65) Prior Publication Data
US 2011/0237383 A1 Sep. 29, 2011

(30) Foreign Application Priority Data
Sep. 29, 2008 (EP) .................................... 08017106

(51) Int. Cl.
*F16H 57/08* (2006.01)
*F16H 57/02* (2012.01)

(52) U.S. Cl.
USPC .......................... 475/331; 475/337; 74/606 R

(58) Field of Classification Search
USPC ......... 475/330, 331, 337, 903; 74/606 R, 608
See application file for complete search history.

(56) References Cited

U.S. PATENT DOCUMENTS

| 1,786,158 | A | * | 12/1930 | Hawes | 475/329 |
|---|---|---|---|---|---|
| 1,945,361 | A | | 1/1934 | Ball | |
| 2,402,043 | A | * | 6/1946 | Hays | 475/224 |
| 3,289,488 | A | * | 12/1966 | Breuer | 74/410 |
| 4,979,700 | A | | 12/1990 | Palma et al. | |
| 2002/0151405 | A1 | * | 10/2002 | Futterer | 475/331 |
| 2008/0045374 | A1 | | 2/2008 | Mavroidis et al. | |
| 2013/0130862 | A1 | * | 5/2013 | Sprenger | 475/331 |

FOREIGN PATENT DOCUMENTS

| DE | 2423905 | A1 | 12/1974 |
|---|---|---|---|
| DE | 2841331 | A1 | 4/1980 |
| DE | 10251499 | A1 | 5/2004 |
| DE | 102005029858 | A1 | 1/2006 |
| FR | 649236 | A | 12/1928 |
| FR | 660902 | A | 7/1929 |
| JP | 402253031 | A * | 10/1990 |
| JP | 405203000 | A * | 8/1993 |
| WO | WO 0029286 | A1 | 5/2000 |

* cited by examiner

*Primary Examiner* — Roger Pang
(74) *Attorney, Agent, or Firm* — Henry M. Feiereisen LLC

(57) ABSTRACT

The invention relates to a planetary gearbox comprising a drive shaft (1) and a driven shaft (2), which are mounted in a gearbox housing, and at least one first (4) and second (5) planetary stage. Furthermore, a single-piece gearbox housing casing (3) is provided, which encloses the first (4) and second (5) planetary stage and is closed at the end face via a housing cover (7). At least one separating wall (6) is arranged in the interior of the gearbox housing, said separating wall dividing the interior into two subchambers. Each subchamber accommodates a planetary stage. The planetary stages (4, 5) are connected to each other by a shaft that is guided through an opening in the separating wall. Ring gears (14, 24) of the planetary stages are fixed at the end face to the separating wall (6). This allows the use of a material for the ring gears (14, 24), which differs from that of the gearbox housing casing (3) or the separating wall (6), so that no high-grade material has to be used for components, the function of which does not require so.

8 Claims, 2 Drawing Sheets

PLANETARY GEARBOX

CROSS-REFERENCES TO RELATED APPLICATIONS

This application is the U.S. National Stage of International Application No. PCT/EP2009/061450, filed Sep. 4, 2009, which designated the United States and has been published as International Publication No. WO 2010/034607 and which claims the priority of European Patent Application, Serial No. 08017106.9, filed Sep. 29, 2008, pursuant to 35 U.S.C. 119 (a)-(d).

BACKGROUND OF THE INVENTION

In comparison to conventional spur gearings and combined bevel and spur gearings, planetary gear sets afford significant advantages in respect of power density and specific torque, and comprise a sun wheel, a planet carrier with planet wheels and an internally toothed ring gear. Planetary gear sets for industrial applications frequently have a cylindrical constructional form because of a cylindrical basic shape of the ring gears. Planetary gear sets may be mounted as slip-on gearings with a torque bracket, as screw-on or flange-mounted gearings or in a base arrangement with an additional frame.

Cast materials, such as ADI-900, which are suitable for toothings permit constructions in which housing parts and internally toothed ring gears are combined in an integral construction. A disadvantage in this case is that high-grade toothing material is uneconomically also used for housing elements which require less high-grade materials.

DE 10 2005 029 858 A1 discloses a gear set combination comprising a planetary stage and a spur gear stage and having a block-shaped housing. The housing is closed at the end face by a cover. In addition, a gear set housing with a cuboidal basic structure is described in U.S. 2008 045374 A1. DE 102 51 499 A1 describes a gear set combination with a modular construction for cascadeable planetary stages and with complementary flange zones on gear set housing sections.

SUMMARY OF THE INVENTION

The present invention is based on the object of providing a multi-stage planetary gear set which can be produced cost-effectively and can be mounted in a simple manner.

This object is achieved, according to the invention by a planetary gear set having a drive shaft and a driven shaft which are mounted in a gear set housing, and at least one first and second planetary stage. In addition, there is a single-piece gear set housing casing which surrounds the first and second planetary stages and is closed at each end face by a housing cover. At least one separating wall is arranged in the interior of the gear set housing, said separating wall dividing the interior into at least two subchambers. Each subchamber accommodates a planetary stage. The planetary stages are connected to one another by a shaft which is guided through an opening in the separating wall. Ring gears of the planetary stages are fastened at the end face to the separating wall. This enables a different material than for the gear set housing casing or the separating wall to be selected for the ring gears, and therefore high-grade material does not have to be used for components, the function of which does not require this. Advantageous developments of the present invention are indicated in the dependent claims.

According to a preferred refinement of the present invention, the gear set housing encompasses a cuboidal space, wherein fastening points for fastening means are provided at corners of the gear set housing. By this means, a multi-stage planetary gear set is integrated into a block-like housing, thus enabling the planetary gear set to be mounted without additional add-on or supporting elements. Screw-on strips encircling end-face ends of the gear set housing casing are advantageously provided. This significantly simplifies fastening of the planetary gear set on a mounting surface. The gear set housing casing may be, for example, tubular and does not have to have a cuboidal form. This affords advantages in terms of space, weight and cost owing to a smaller consumption of material. In addition, the housing covers can have bearings for the drive shaft and the driven shaft, thus simplifying manufacturing of the planetary gear set.

Furthermore, a bevel gearing, spur gearing, combined bevel and spur gearing or a geared motor can be mounted on the drive side in order to form a gear set or geared motor combination. According to a further refinement, the gear set housing casing can surround a number n of planetary stages, and a number n−1 of separating walls can be arranged in the interior of the gear set housing. Use of the present invention is therefore not restricted to two-stage planetary gear sets. According to an alternative embodiment of the present invention, there are two or more single-piece housing casings which each surround a planetary stage, the housing casings being connected to one another by separating walls. In this manner, multi-stage planetary gear sets which can be produced cost-effectively and are composed of cascadeable individual gearing modules can be realized.

BRIEF DESCRIPTION OF THE DRAWING

The invention is explained in more detail below using an exemplary embodiment with reference to the drawing, in which.

DETAILED DESCRIPTION OF PREFERRED EMBODIMENTS

Figure 1:
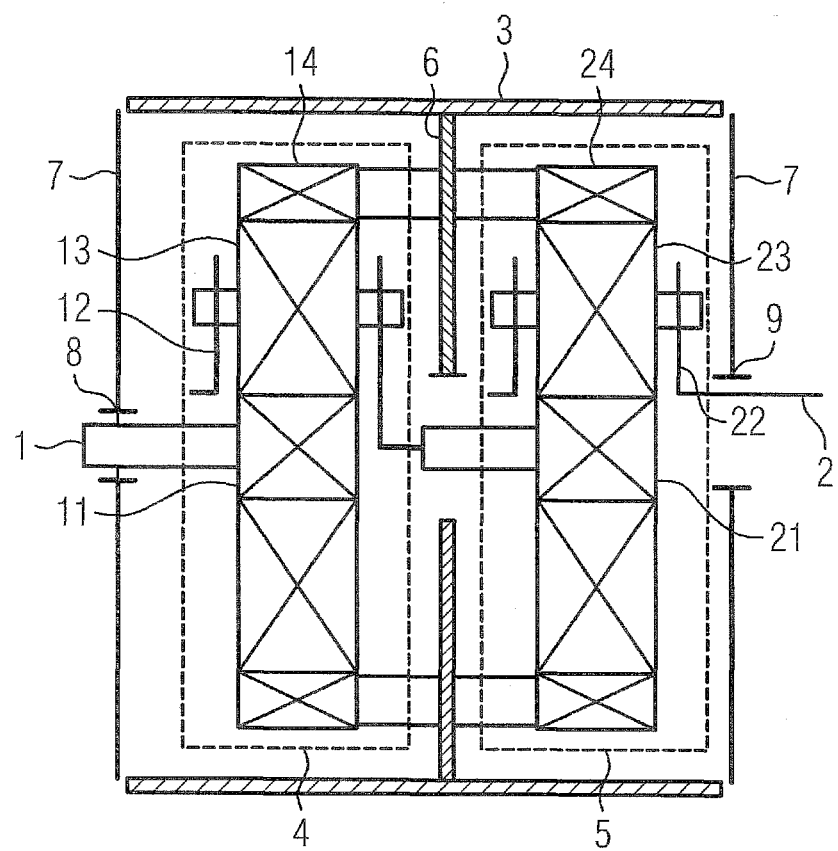
FIG. 1 shows a schematic illustration of a planetary gear set according to the invention.
Figure 2:
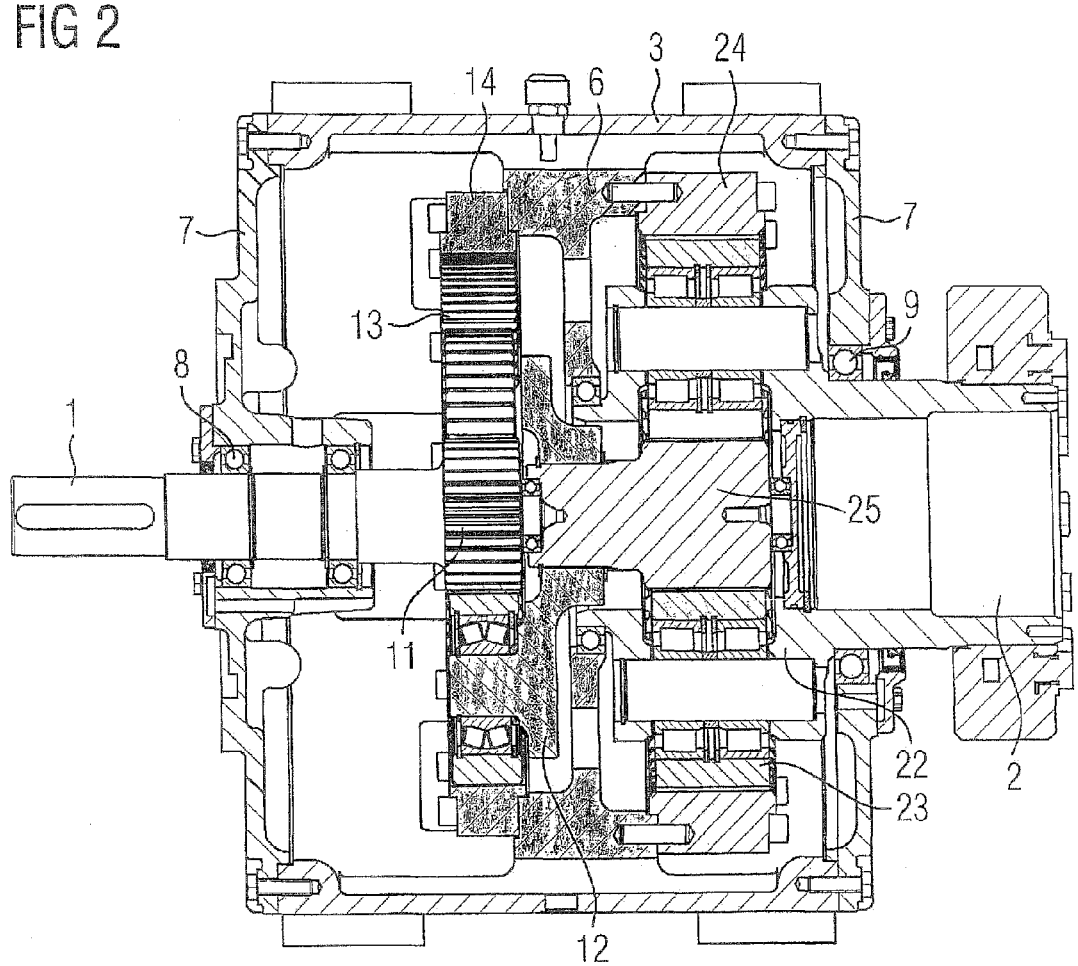
FIG. 2 shows a sectional illustration of the planetary gear set according to the invention from FIG. 1.

The planetary gear set illustrated in FIG. 1 comprises a drive shaft 1 and a driven shaft 2 which are mounted in a gear set housing 26. This is illustrated in a sectional illustration in FIG. 2. The drive shaft 1 is connected to a sun wheel 11 of a first planetary stage 4 while the driven shaft 2 is connected to a planet carrier 22, which comprises a plurality of planet wheels 23, of a second planetary stage 5. The first planetary stage 4 also comprises a planet carrier 12 which accommodates a plurality of planet wheels 13 meshing with a fixed ring gear 14, and is connected to a sun wheel 21 of the second planetary stage 5. The second planetary stage 5 likewise has a fixed ring gear 24 which meshes with the planet wheels 23 of the second planetary stage 5.

The gear set housing 26 comprises a single-piece gear set housing casing 3 which surrounds the first planetary stage 4 and second planetary stage 5 and is closed at each end face by a housing cover 7. Furthermore, the housing covers 7 have bearings 8, 9 for the drive shaft 1 and the driven shaft 2.

A separating wall 6 is arranged in the interior of the gear set housing 26, said separating wall dividing the interior into two subchambers, in each of which a planetary stage 4, 5 is arranged. The separating wall 6 has an opening through which a shaft 25 connecting the planet carrier 12 of the first planetary stage 4 and the sun wheel 21 of the second planetary stage 5 is guided. In addition, the ring gears 14, 24 of the planetary stages 4, 5 are fastened to the separating wall 6, wherein an end face of each ring gear 14, 24 bears against the separating wall 6.

Figure 3:
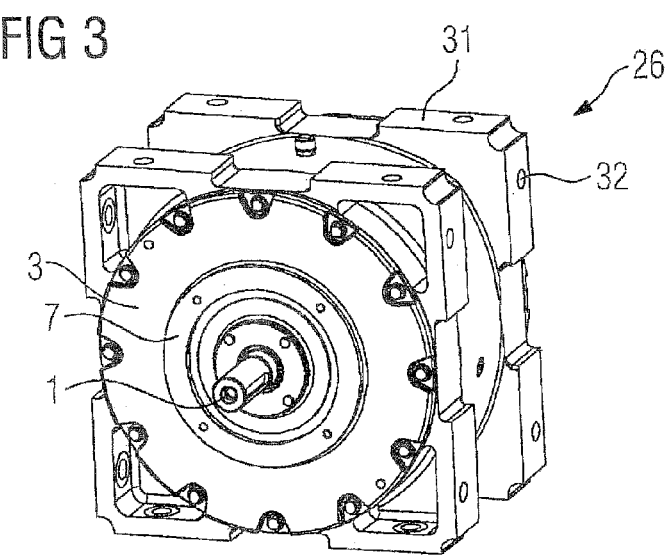
FIG. 3 shows a perspective illustration of the planetary gear set according to the invention from FIG. 1.

According to the perspective illustration according to FIG. 3, the gear set housing casing 3 is tubular and is surrounded at end-face ends by encircling screw-on strips 31, and therefore the gear set housing 26 encompasses a cuboidal space. Fastening points for fastening means are provided at corners of the gear set housing 26. In the present exemplary embodiment, the screw-on strips 31 have bores 32 for this purpose.

The planetary gear set illustrated in FIG. 3 can be mounted in a simple manner, in particular without additional add-on and supporting elements. In addition, the planetary gear set can be mounted both in a base arrangement and in a slip-on configuration. The gear set housing 26 is advantageously dimensioned in such a manner that it reliably transmits reaction or housing torques.

The use of the present invention is not restricted to the described exemplary embodiment.

The invention claimed is:

1. A planetary gear set, comprising:
   a gear set housing having an interior;
   a drive shaft and a driven shaft mounted in the gear set housing;
   first and second planetary stages having ring gears;
   a gear set housing casing placed in surrounding relationship to the first and second planetary stages and having opposite end faces;
   housing covers closing the end faces of the gear set housing casing in one-to-one correspondence;
   at least one separating wall dividing the interior of the gear set housing into at least two subchambers, said subchambers accommodating the first and second planetary stages in one-to-one correspondence, with the ring gears of the planetary stages being directly fastened with their end faces to the separating wall and being radially separated from the radially outermost region of the housing casing; and
   a shaft guided through an opening in the separating wall and connecting the first and second planetary stages.

2. The planetary gear set of claim 1, wherein the gear set housing encompasses a cuboidal space and has corners to provide fastening points for fastening means.

3. The planetary gear set of claim 1, further comprising wrap-around screw-on strips secured to the end faces of the gear set housing casing.

4. The planetary gear set of claim 1, wherein the gear set housing casing is tubular.

5. The planetary gear set of claim 1, wherein the housing covers have bearings for support of the drive shaft and the driven shaft, respectively.

6. The planetary gear set of claim 1, wherein the gear set housing casing surrounds a number n of planetary stages, and wherein a number n−1 of separating walls are arranged in the interior of the gear set housing.

7. The planetary gear set of claim 1, wherein the drive shaft is connected to a sun wheel of the first planetary stage, and wherein the driven shaft is connected to a planet carrier of the second planetary stage.

8. The planetary gear set of claim 1, wherein the ring gears are made of a material which is different than a material of the gear set housing casing or the separating wall.

\* \* \* \* \*